United States Patent [19]

Nicco

[11] 4,320,088
[45] Mar. 16, 1982

[54] PROCESS AND APPARATUS FOR WIDENING THE POLYETHYLENE MOLECULAR WEIGHT DISTRIBUTION BY USING TWO REACTORS AND TWO SEPARATORS

[75] Inventor: Adrien Nicco, Bethune, France

[73] Assignee: Societe Chimique des Charbonnages-CDF Chimie, Paris, France

[21] Appl. No.: 212,234

[22] Filed: Dec. 2, 1980

Related U.S. Application Data

[62] Division of Ser. No. 108,235, Dec. 28, 1979, Pat. No. 4,269,948.

[30] Foreign Application Priority Data

Dec. 28, 1978 [FR] France ............................ 78 36625

[51] Int. Cl.³ ..................... C08F 2/02; C08F 10/02; B01J 12/02
[52] U.S. Cl. ............................ 422/134; 422/137; 422/187; 422/234
[58] Field of Search ............... 422/131, 134, 135, 137, 422/138, 189, 187, 234; 525/53; 526/65

[56] References Cited

U.S. PATENT DOCUMENTS

| | | | |
|---|---|---|---|
| 3,649,208 | 3/1972 | Hornschuch | 422/134 |
| 3,914,342 | 10/1975 | Mitchell | 525/53 |
| 3,969,470 | 7/1976 | Spiegelman | 525/53 |
| 4,105,842 | 8/1978 | Nicco et al. | 526/65 |
| 4,168,356 | 9/1979 | Levresse et al. | 526/65 |

Primary Examiner—Michael S. Marcus
Attorney, Agent, or Firm—Finnegan, Henderson, Farabow, Garrett & Dunner

[57] ABSTRACT

A process and apparatus for widening the molecular distribution of ethylene polymers produced at high pressure and at high temperature by polymerizing ethylene at a pressure between 600 and 3,000 bars and at a temperature between 160° C. and 320° C., in two reactors operating in parallel. In the first reactor, the reaction takes place in the presence of less than 0.1% of hydrogen for the purpose of producing a polymer of high molecular weight. In the second reactor, the reaction takes place in the presence of 0.2 to 5% of hydrogen for the purpose of fabricating a polymer of low molecular weight. The effluents from these two reactors are expanded and then moved to a set of two separators interconnected so as to efficiently mix the polymers produced in the two reactors by recycling the least possible amount of hydrogen into the supply circuit of the first reactor in such manner that the proportion of hydrogen in the first reactor remains less than 0.1% in moles. Ethylene polymers are produced with a fluidity index between 0.1 and 2 and a polydispersity index larger than 8.

2 Claims, 1 Drawing Figure

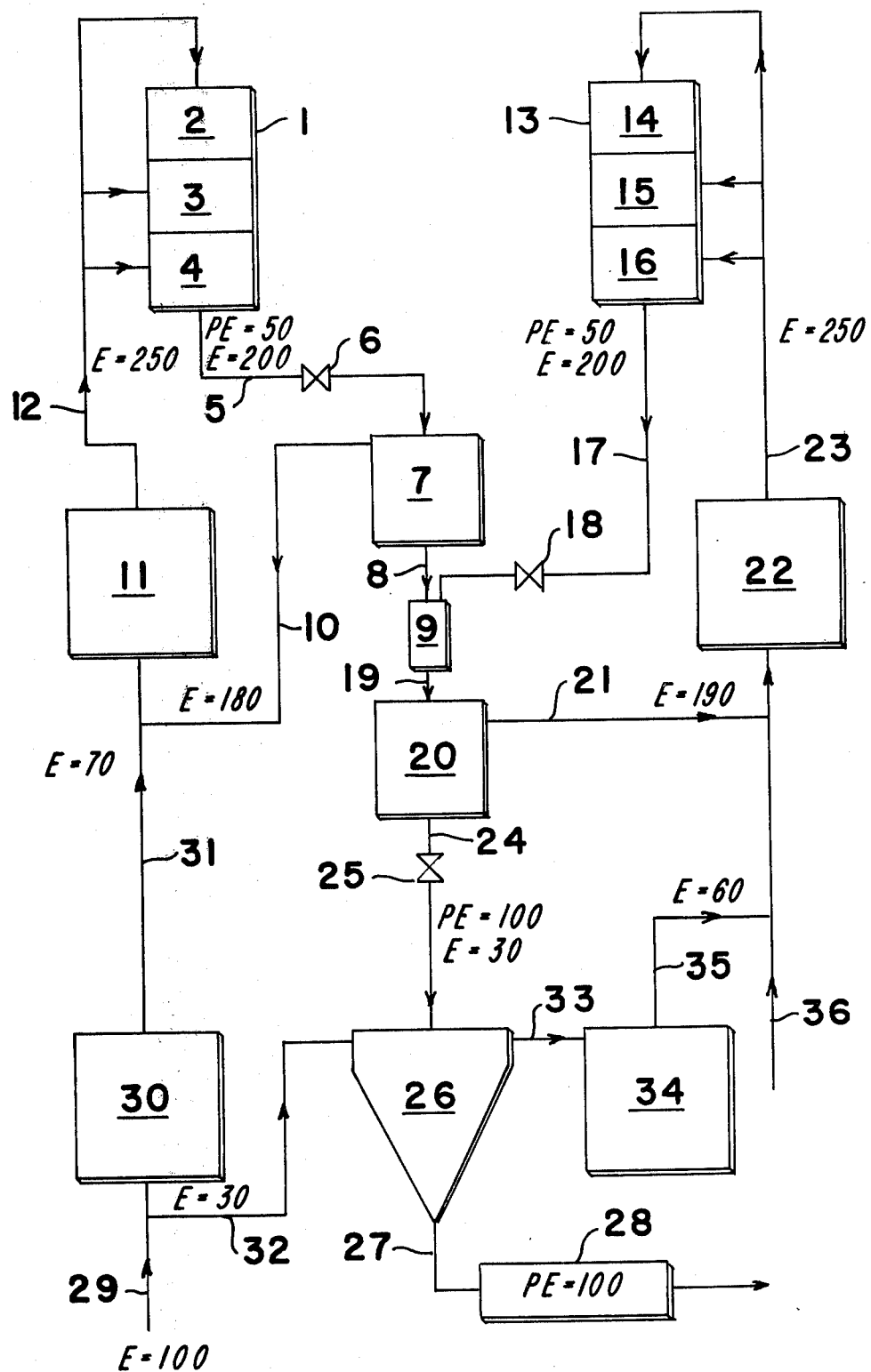

PROCESS AND APPARATUS FOR WIDENING THE POLYETHYLENE MOLECULAR WEIGHT DISTRIBUTION BY USING TWO REACTORS AND TWO SEPARATORS

This is a division of application Ser. No. 108,235 filed Dec. 28, 1979, now U.S. Pat. No. 4,269,948.

BACKGROUND OF THE INVENTION

The present invention relates to polymerizing ethylene at high pressure and high temperature and more particularly to the widening of the polyethylene molecular weight distribution by using two reactors and two separators.

It is known to polymerize ethylene at high pressure and temperature using a Ziegler-type catalytic system comprising on one hand at least one halogenated compound of a transition metal and on the other hand at least one activator selected from the hydrides and the organo-metallic compounds of the metals of groups I through III of the periodic table. However, the manufacture by this process of high-density polyethylene or of ethylene copolymers with a fluidity index (measured by the ASTM D 1238-73 standard) between approximately 0.1 and 2 and a polydispersity index (Mw/Mn ratio of the average molecular mass in weight to the average molecular mass as a number) exceeding 8 is especially delicate. In particular, the selection of the catalytic system, the selection of the temperature and pressure conditions, and the use of a reactor comprising several zones operating under different conditions do not suffice to modify the polydispersity index in the desired direction.

One solution to the above cited problem is described in French Pat. No. 2,346,374, consisting in partially liquefying at a temperature between −50° C. and +20° C. the gaseous phase from a first reactor at a pressure of 80 to 250 bars, in expanding to a pressure between 10 and 60 bars, and in then separating this flow in a second separator, the liquid phase being recompressed and moved to a first zone of the reactor while the gaseous phase is recompressed and moved to a second zone of the reactor. This solution is industrially satisfactory because it achieves a polydispersity index of about 15, but it suffers from the draw-back of being costly in energy.

SUMMARY OF THE INVENTION

A first object of the present invention therefore is a process and apparatus for producing with greater energy efficiency ethylene polymers with a fluidity index (per ASTM D 1238-73) between approximately 0.1 and 2, a polydispersity index exceeding approximately 8 and, in sufficient degree, very high molecular masses, all these being properties required for transforming the polymers by blow-extrusion.

It is also known to polymerize ethylene at high pressures and temperatures using free-radical producing initiators such as oxygen, peroxides, and peresters, to form low-density polyethylene.

When using such a process, it is a second object of the present invention to offer a method and apparatus allowing mixing low-density polyethylenes of different molecular masses and/or structures.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process of the invention comprises polymerizing ethylene at a pressure between 600 and 3,000 bars and at a temperature between 160° C. and 320° C. in two reactors operating in parallel. In the first reactor, the ethylene polymerization is achieved in the presence of at least 0.1% of hydrogen for the purpose of producing a polymer of high molecular weight. In the second reactor, the ethylene polymerization is achieved in the presence of 0.2 to 5% of hydrogen for the purpose of producing a polymer of low molecular weight. The effluents from these two reactors are expanded and then moved to a set of two separators so interconnected as to efficiently mix the polymers produced in the two reactors by recycling the least amount of hydrogen possible into the supply circuit of the first reactor in such a manner that the proportion of hydrogen in the first reactor remains less than 0.1% in moles.

Preferably the effluent from the first reactor is evacuated through an expansion valve into a first separator operating at a pressure of 150 to 500 bars, the ethylene thus separated being recycled to the first reactor and the separated polymer being evacuated from the first separator to a mixer. It is further preferred that the effluent from the second reactor be evacuated through an expansion valve into the mixer. A second separator operating at a pressure between 100 and 400 bars is preferably fed by the effluents from the mixer, the ethylene thus separated being recycled at least in part to the second reactor and the separated polymer mixture being evacuated from the second separator to a degassing hopper operating at a pressure of 1 to 10 bars, the polymer leaving the hopper being recovered while the gaseous ethylene separated in the hopper is recycled to at least one of the reactors.

An alternative preferred embodiment of the process in accordance with the present invention employs a first reactor in which the polymerization of the ethylene takes place in the presence of less than 0.1%-moles of hydrogen and of which the effluent is evacuated through an expansion valve into a mixer. The effluent from the second reactor is evacuated through an expansion valve into a first separator operating at a pressure from 150 to 500 bars, the ethylene thus prepared being recycled to the second reactor and the separated polymer being evacuated from the first separator to the mixer. A second separator operating at a pressure from 100 to 400 bars is fed by the effluents from the mixer, the ethylene thus separated being recycled at least in part to the second reactor and the separated polymer mixture being evacuated from the second separator to a degassing hopper operating at a pressure from 1 to 10 bars, the polymer leaving the hopper being recovered while the separated gaseous ethylene is recycled to at least one of the reactors.

Further in accordance with the purpose of the invention, as embodied and broadly described herein, the apparatus of the invention comprises a first reactor, a first separator, an expansion valve located at the outlet of the first reactor and connected to the first separator, a mixer connected to the base of the first separator, a first hypercompressor of which the intake is connected to the outlet of the first separator and of which the outlet is connected to the first reactor, a second reactor, an expansion valve located at the outlet of the second reactor and connected to the mixer, a second separator connected to the outlet of the mixer, a second hypercompressor of which the intake is connected to the outlet of the second separator and of which the outlet is connected to the second reactor, a hopper, an expansion valve located at the base of the second separator and connected to the hopper, a compressor of which the intake is connected to the top of the hopper and of which the outlet is connected to the intake of the second hypercompressor, a hydrogen source connected to one intake of the second hypercompressor, and an ethylene source connected to an intake of the first hypercompressor.

In an alternative preferred embodiment in accordance with the purpose of the invention, as embodied and broadly described herein, the apparatus of the invention comprises a first reactor, a mixer, an expansion valve located at the outlet of the first reactor and connected to tthe mixer, a second separator connected to the outlet of the mixer, a second reactor, a first separator, an expansion valve located at the outlet of the second reactor and connected to the first separator, a first hypercompressor of which the intake is connected to the second separator and of which the outlet is connected to the first reactor, a second hypercompressor of which the intake is connected to the second separator and of which the outlet is connected to the second reactor, a hopper, an expansion valve located at the base of the second separator and connected to the hopper, a compressor of which the intake is connected to the top of the hopper and of which the outlet is connected to the intake of the first hypercompressor, an ethylene source connected to the intake of the compressor, and a hydrogen source connected to the intake of the second hypercompressor.

The accompanying drawing which is incorporated in and constitutes a part of this specification, illustrates an embodiment of the invention and, together with the description, serves to explain the principles of the invention.

BRIEF DESCRIPTION OF THE DRAWINGS

The FIGURE illustrates a flow diagram of a preferred embodiment in accordance with the present invention.

DESCRIPTION OF THE PREFERRED EMBODIMENTS

Reference will now be made in detail to the present preferred embodiments of the invention, an example of which is illustrated in the accompanying drawing.

The process of the invention can be implemented by polymerizing ethylene in the presence of 1 to 50% by weight of an inert hydrocarbon such as, e.g., propane or butane.

The process of the invention is implemented in continuous manner and can be carried out using either tubular or autoclave reactors, or using one reactor of each type. Each of the reactors may comprise one or more zones of reaction. The invention also applies to the copolymerization of ethylene with such alpha-olefins as, e.g., propylene and butene-1, and to the terpolymerization of ethylene with an alpha-olefin such as propylene and with a non-conjugate diolefin.

The process of the invention can be implemented using a Ziegler-type catalytic system comprising on one hand at least one halogenated compound of a transition metal and on the other hand at least one activator selected from the hydrides and the organo-metallic compounds of the metals of groups I through III of the periodic table. Even though very numerous, among the applicable halogenated compounds of the transition metals are the pi-allyl or benzyl complexes of chromium, zirconium and titanium, the trichlorides of vanadium and of titanium (the latter possibly forming mixed crystals with aluminum chloride in the form of $TiCl_3$ ($\frac{1}{3}$)$AlCl_3$), possibly fastened to a substrate comprising, for example, a halide, a monohalide, or a hydrohalide of magnesium. All these compounds can be used in the presence of complexing agents such as heavy alcohols, metal alcoholates, the silicates of alkyl, aryl, or alkylsiloxanes, ethers or amines. Among the applicable activators are, in particular, the trialkylaluminums, the halogenodialkylaluminums, and the alkylsiloxalanes. The process of the invention furthermore may be implemented by known free-radical forming initiators such as oxygen, peroxides, and/or peresters. These catalysts preferably are used in the form of solutions in an inert diluent or in the form of dispersions.

Those skilled in the art will select the catalytic system as a function of the temperature of the reactor in which it is to be used, that is, a given catalytic system will be used for those conditions of temperature for which its thermal stability and its reactivity to ethylene are known. Similarly those skilled in the art will select the dwell time of the catalytic system as a function of the temperature of the reactor in which it will be used, and in general it will be between approximately 5 and 80 seconds; this time will be shorter the higher the application temperature of the catalyst.

In the process of the invention, the ethylene separated in the second separator is recycled to the second reactor in part or preferably in whole; to that end it is recompressed to the pressure of the second reactor. When only part of the ethylene separated in the second separator is recycled to the second reactor, the remaining portion is recycled to the first reactor; to that end it is recompressed to the pressure of the first reactor.

In accordance with the invention, the gaseous ethylene separated in the hopper is recycled to either or both reactors; preferably this ethylene will be recycled to a single reactor so as not to add to the complexity of the process. For instance it will be recycled to the second reactor in the implementation first described above and to the first reactor in the implementation described in the second place. To that end it will be recompressed to the pressure of the second separator, added to the flow of ethylene from the second separator, and then recompressed with the flow of ethylene as previously described.

In the process of the invention, each of the reactors operates at pressures between 600 and 3,000 bars and at temperatures between 160° C. and 320° C. The operational conditions for the first reactor may be selected to be different from those of the second; nevertheless, for the sake of regularity of operation of the facility, it will be advantageous most of the time to choose operational conditions close to each other for both reactors.

As previously indicated, the characteristic of the invention is notably that the hydrogen concentrations of the two reactors are very different. Thus preferably the ratio of the hydrogen concentration in the second reactor to that in the first reactor will be equal to or larger than 5. The hydrogen concentration in the first reactor also may be zero. Similarly, to obtain efficiently the various objects of the invention previously stated, the supply rates to each reactor preferably will be so chosen that the part of the total polymer produced in the first reactor will be between 20 and 60% by weight.

It will be clear to those skilled in the art that the first reactor produces a polymer of high molecular weight and of very high viscosity while the second reactor produces a polymer of low molecular weight and of very low viscosity. When it is desired to manufacture a final polymer with a polydispersity index equal to or exceeding 8, the ratio of the viscosity of the polymer made in the first reactor to that of the polymer made in the second reactor is always equal to or exceeds 2,000 and the mixer located between the two separators therefore must be of corresponding design. However, the design of this mixer is a problem which can be solved by those skilled in the pertinent art, considering that the motive fluid received by this mixer is a mixture divided with respect to energy into liquid polymer particles and gaseous ethylene, the weight proportion of the polymer in the motive fluid being equal to the conversion rate of the polymerization reaction, that is about 20% as a rule. An example of an applicable mixer within the scope of the present invention is the jet mixer cited in PERRY'S CHEMICAL ENGINEERS HANDBOOK, 4th ed., pp. 21-12 and shown in FIGS. 6-28 of this reference.

Thus, from the detailed exposition of the characteristics and of the two modes of implementation of the invention, there results the overall statement of the invention, which constitutes in an ethylene polymerization process at a pressure between 600 and 3,000 bars and a temperature between 160° C. and 320° C., in two reactors operating in parallel, using a first reactor in which the reaction takes place in the presence of less than 0.1% of hydrogen to produce a polymer of high molecular weight, a second reactor in which the reaction takes place in the presence of 0.2 to 5% of hydrogen to produce a polymer of low molecular weight, the effluents from these two reactors being expanded and then moved to a set of two separators interconnected in such manner as to effectively mix the polymers made in the two reactors by recycling the least amount possible of hydrogen in the supply circuit of the first reactor so that the proportion of hydrogen in the first reactor remains less than 0.1% in moles.

The process of the invention can be implemented using the method described in French Pat. No. 2,313,399, that is by cooling the first separator by injecting cold ethylene at a pressure less than that of the first separator between the expansion valve of either the first or the second reactor, depending on the selected mode of implementation, which discharges its effluents into the separator, and the intake of the separator. In general the cold ethylene thus injected is at a pressure between 20 and 180 bars, and either it is tapped downstream of a coolant in the recycling circuit of the gas separated in the first separator, or it is directly fed from an ethylene supply circuit at the desired pressure. In the first case, the cold-ethylene supply circuit comprises an expansion valve to lower the pressure from the magnitude in the first separator to that desired at the intake of the injection means. The injection of the cold ethylene will be carried out using a means such as described in French Pat. No. 2,313,399.

When the polymerization is carried out using a Ziegler-type catalytic system, the process of the invention can be combined with the catalyst deactivation method described in French Pat. No. 2,302,305, consisting in injecting at least one alkali metal salt or alkaline earth metal salt of carboxylic acid, selected in such a manner that its reaction products with the catalyst remain in the polymer, into the discharge vicinity of a reactor. In accordance with the present invention, as embodied herein, the salt advantageously will be injected in the molten state or diluted in a hydrocarbon either near the outlet of each reactor or in the separator.

The invention will be better understood in the light of the description of the single figure of the drawing showing a preferred implementation. The weights of the ethylene (E) flows and of the polyethylene (PE) flows are shown in this figure at particular different points of the facility. The figure shows a high-pressure ethylene polymerization plant comprising a first reactor 1 of the agitated autoclave-type and internally divided into three zones 2, 3, and 4 by means of screens. An evacuation conduit 5 for the reaction mixture passes from zone 4 through an expansion valve 6 into the first separator 7. This separator comprises on one hand at its base a polymer evacuation conduit 8 which joins the mixer 9, and on the other hand at its top a conduit 10 which passes through a coolant (not illustrated) into the intake of a first hyper-compressor 11. At the outlet of the compressor 11, a conduit 12 feeds the various zones of reactor 1 with high-pressure ethylene.

The polymerization plant furthermore comprises a second reactor 13 of the agitated autoclave-type which is internally divided into three zones 14, 15, and 16 by means of screens. A tapping conduit 17 for the reaction mixture starts at zone 16 and passes through an expansion valve 18 into the intake of mixer 9. At the outlet of the mixer, a tapping conduit 19 for the mixture ends in a second separator 20. This separator comprises at its top a conduit 21 which passes through a coolant (not illustrated) and ends at the intake (suction) of a second hypercompressor 22. At the outlet (pressure) of the hypercompressor, a conduit 23 feeds the different zones of reactor 13 with high-pressure ethylene. The separator 20 also comprises at its base an evacuation conduit 24 for the polymer which through an expansion valve 25 rejoins the degassing hopper 26. At the bottom of the hopper, a conduit 27 transfers the degassed polymer to a kneading means 28.

A conduit 29 begins at an ethylene source (not illustrated) and divides into a main branch feeding a first compressor 30 at the exit (pressure) of which the compressed ethylene is transferred to the intake (suction) of the first hypercompressor 11 by means of a conduit 31, and into an auxiliary branch 32 feeding the hopper 26, a conduit 33 transferring the mixture of the ethylene extracted from the polymer and of the additional ethylene from the source (not illustrated) through the auxiliary branch 32 to the intake (suction) of a second compressor 34. A compressed-ethylene transfer conduit 35 consecutively joins a conduit 36 from a hydrogen source (not illustrated) and then the conduit 21 and ends at the intake (suction) of the hypercompressor 22.

In conformity with the first mode of implementation described above and shown in the figure, the present invention therefore relates to apparatus for polymerizing ethylene and comprises a first reactor, a first separator, an expansion valve located at the outlet of the first reactor and connected to the first separator, a mixer connected to the base of the first separator, a first hypercompressor of which the intake is connected to the outlet of the first separator and reactor, an expansion valve located at the outlet of the second reactor and connected to the mixer, a second separator connected to the outlet of the mixer, a second hypercompressor of which the intake is connected to the outlet of the second separator and of which the outlet is connected to the second reactor, a hopper, an expansion valve located at the base of the second separator and connected to the hopper, a compressor of which the intake is connected to the top of the hopper and of which the outlet is connected to the intake of the second hypercompressor, a source of hydrogen connected to one intake of the second hypercompressor, and a source of ethylene connected to one intake of the first hypercompressor.

In conformity with the second mode of implementation previously described, the present invention also concerns apparatus for polymerizing ethylene, comprising a first reactor, a mixer, an expansion valve located at the outlet of the first reactor and connected to the mixer, a second separator connected to the outlet of the mixer, a second reactor, a first separator, an expansion valve located at the outlet of the second reactor and connected to the first separator, a first hypercompressor of which the intake is connected to the second separator and of which the outlet is connected to the first reactor, a second hypercompressor of which the intake is connected to the second separator and of which the outlet is connected to the second reactor, a hopper, an expansion valve located at the base of the second separator and connected to the hopper, a compressor of which the intake is connected to the top of the hopper and of which the outlet is connected to the intake of the first hypercompressor, an ethylene source connected to the intake of the compressor, and a hydrogen source connected to the intake of the second hypercompressor. In this embodiment, the equipment of the invention furthermore may comprise a conduit connecting the outlet of the second separator to the intake of the second hypercompressor.

The set consisting of the first and second hypercompressors can be replaced by a single one comprising a first set of cylinders connected to the first reactor and a second set of cylinders connected to the second reactor without thereby exceeding the scope of the invention, in each mode of implementation.

The invention shall be better understood in light of the following illustrative examples.

EXAMPLE 1

Ethylene polymerization is carried out in a plant as shown in the drawing. Reactors 1 and 13 are cylindrical autoclaves comprising inside metal screens bounding three zones of identical volume.

Reactor 1 operates at a pressurre of 1,300 bars and is fed with 50% of the total ethylene. The temperature in zone 2 is 190° C., that of zone 3 is 240° C., and that of zone 4 is 290° C. A hydrogen concentration of either zero or less than analytically detectable is maintained in this reactor.

Reactor 13 operates at a pressure of 900 bars and is fed with 50% of the total ethylene. The temperature is 180° C. in zone 14, 230° C. in zone 15 and 280° C. in zone 16. A hydrogen concentration of 5% in moles is maintained in this reactor. The catalytic system injected into each reactor comprises on one hand the compound of formula TiCl, ($\frac{1}{3}$)AlCl$_3$, 3MgCl$_2$ obtained by grinding together violet titanium trichloride and anhydrous magnesium chloride, and on the other hand dimethylethyldiethylsiloxalane in such an amount that the atomic ratio of Al/Ti is 3. The dwell time of this catalytic system in each reactor is 25 seconds.

Separator 7 operates at a pressure of 220 bars, separator 20 at 180 bars. The flow of ethylene (E) and of polyethylene (PE) passing through the various conduits of the plant are those shown in the drawing; it will be noted in particular that the conversion rate of the polymerization reaction is 20% in each reactor. A catalyst deactivator, essentially consisting of molten pure calcium stearate, is injected at each outlet of the reactors.

The polymer obtained is characterized by the various properties listed below, in particular the fluidity index measured per ASTM D 1238-73 standard, the average molecular mass in weight Mw measured by gel permeation chromatography, the polydispersity index defined above, and the density.

The experimental values are as follows:

| | |
|---|---|
| density | 0.958 g/cm$^3$ |
| fluidity index | 0.15 g/10 mn |
| Mw = 155,000 | |
| polydispersity index (Mw/Mn) | 14.1 |

EXAMPLE 2

Ethylene is polymerized in a plant described above in the second mode of implementation of the invention. The two reactors are identical with those of example 1 and operate each at a pressure of 1,200 bars, each being fed 50% of the total ethylene. They operate at staggered temperatures in identical manner, as follows: 200° C. in the first zone, 220° C. in the second zone, and 240° C. in the third zone. The catalytic system injected into each of the two reactors comprises on one hand violet titanium trichloride TiCl$_3$ ($\frac{1}{3}$)AlCl$_3$, and on the other hand trioctylaluminum in such an amount that the atomic ratio of Al/Ti is 3. The average dwell time of this system in each reactor is 60 seconds.

In conformity with the process of the invention, the hydrogen concentration is kept at 0.1% in moles in the first reactor and at 1% in moles in the second reactor. The first separator operates as a pressure of 300 bars, and the second separator operates at a pressure of 250 bars. Lastly, the catalyst is deactivated in the same manner as in example 1.

The polymer obtained is characterized by the same properties as above, with the following experimental values:

| | |
|---|---|
| density | 0.957 g/cm$^3$ |
| fluidity index | 0.9 g/10 mn |
| Mw = 160,000 | |
| polydispersity index: | 8.4 |

It will be apparent to those skilled in the art that various modifications and variations could be made in the process and apparatus of the invention without departing from the scope or spirit of the invention.

What is claimed is:

1. Apparatus for carrying out the polymerization of ethylene comprising
   (a) means defining a first reactor;
   (b) means defining a first separator;
   (c) means defining an expansion valve located at the outlet of the first reactor and connected to the first separator;

(d) means defining a mixer connected to the base of the first separator;
(e) means defining a first hypercompressor of which the intake is connected to the outlet of the first separator and of which the outlet is connected to the first reactor;
(f) means defining a second reactor;
(g) means defining an expansion valve located at the outlet of the second reactor and connected to the mixer;
(h) means defining a second separator connected to the outlet of the mixer;
(i) means defining a second hypercompressor of which the intake is connected to the outlet of the second separator and of which the outlet is connected to the second reactor;
(j) means defining a degassing hopper;
(k) means defining an expansion valve located at the base of the second separator and connected to the hopper;
(l) means defining a compressor of which the intake is connected to the top of the hopper and of which the outlet is connected to the intake of the second hypercompressor;
(m) means defining a source of hydrogen connected to one intake of the second hypercompressor; and
(n) means defining a source of ethylene connected to an intake of the first hypercompressor.

2. Apparatus for polymerizing ethylene, comprising
(a) means defining a first reactor;
(b) means defining a mixer;
(c) means defining an expansion valve located at the outlet of the first reactor and connected to the mixer;
(d) means defining a second separator connected to the outlet of the mixer;
(e) means defining a second reactor;
(f) means defining a first separator;
(g) means defining an expansion valve located at the outlet of the second reactor and connected to the first separator;
(h) means defining a first hypercompressor of which the intake is connected to the second separator and of which the outlet is connected to the first reactor;
(i) means defining a second hypercompressor of which the intake is connected to the second separator and of which the outlet is connected to the second reactor;
(j) means defining a degassing hopper;
(k) means defining an expansion valve located at the base of the second separator and connected to the hopper;
(l) means defining a compressor of which the intake is connected to the top of the hopper and of which the outlet is connected to the intake of the first hypercompressor;
(m) means defining a source of ethylene connected to the intake of the compressor; and
(n) means defining source of hydrogen connected to the intake of the second hypercompressor.

* * * * *